United States Patent [19]

König

[11] Patent Number: 4,899,332

[45] Date of Patent: Feb. 6, 1990

[54] DATA TRANSMISSION/RECEPTION SYSTEMS FOR ELECTRO-HYDRAULIC CONTROL SYSTEMS

[75] Inventor: Johannes König, Munich, Fed. Rep. of Germany

[73] Assignee: Gewerkschaft Eisenhutte Westfalia GmbH, Fed. Rep. of Germany

[21] Appl. No.: 191,550

[22] Filed: May 9, 1988

[30] Foreign Application Priority Data

May 9, 1987 [DE] Fed. Rep. of Germany ....... 3715588

[51] Int. Cl.$^4$ .................... H04J 15/00; E21D 23/12
[52] U.S. Cl. ..................................... 370/32; 91/527; 405/302
[58] Field of Search ............... 340/825.77, 825.78; 60/403; 244/78; 91/527; 364/900; 405/302; 370/32

[56] References Cited

U.S. PATENT DOCUMENTS

| | | | |
|---|---|---|---|
| 4,162,371 | 7/1979 | Belforte | 370/27 |
| 4,451,181 | 5/1984 | Trumper et al. | 91/527 |
| 4,570,217 | 2/1986 | Allen et al. | 364/900 |
| 4,638,473 | 1/1987 | Cooperman et al. | 370/27 |

Primary Examiner—Benedict V. Safourek
Assistant Examiner—Tesfaldet Bocure
Attorney, Agent, or Firm—Samules, Gauthier, Stevens & Kehoe

[57] ABSTRACT

A data transmission/reception system usable for bi-directional data transmission in electro-hydraulic control systems between two adjacent supports of a mine installation which each have their own transmitting and receiving stations in a control unit. Bi-directional data exchange takes place via a single wire data bus which is used for simultaneous transmission and reception and forms the summation point for adding the transmitted signals from two transmitters. Each transmitting and receiving station is provided with a subtraction circuit connected to a receiver of the respective transmitting and receiving stations and to which the transmitted signals from its own transmitter are supplied in each case at the subtraction circuit input. The other input of the subtraction circuit is connected to the bi-directional data bus. In this way, a duplex connection between the two transmitting and receiving stations is created in which the transmitted signals from one transmitter is subtracted from two-way transmissions at the associated receiver.

9 Claims, 4 Drawing Sheets

DATA TRANSMISSION/RECEPTION SYSTEMS FOR ELECTRO-HYDRAULIC CONTROL SYSTEMS

FIELD OF THE INVENTION

The present invention relates to a data transmission/reception system for use in particular for electro-hydraulic control systems for mine workings. Although the invention as described hereinafter relates to electro-hydraulic control systems for mine installations, the invention can also be used for other applications in mining and civil engineering, for example in systems for monitoring and/or controlling extracting plant and extracting machinery in mining, for example cutting apparatus or drum shearers, in the control of complete or partial cutting machinery, of advancing shields and cutting shields, conveyors and the like.

BACKGROUND OF THE INVENTION

In known electro-hydraulic control systems, each roof support along a longwall face is provided with an individual electronic control device with a microprocessor with all the individual control units being connected to one another and optionally to a central control station for transmission of data via a data transmission system. (See Gluckauf", 1981, pages 1155 to 1162; "Gluckauf", 1984, pages 135 to 140; "Gluckauf", 1986, pages 543 to 552; "Gluckauf", 1986, pages 1183 to 1187). The individual control units are provided with keyboards with which the various control processes (individual or sequence control at adjacent supports, sequential control with sliding supporting groups etc.) can be triggered. The intrinsically safe control systems preferably comprise a decentralised power supply system.

In known electro-hydraulic control systems, the construction and cabling costs are considerable owing to the plurality of supports normally used and the consequential plurality of electronic control units interconnected via the power supply and data transmission systems.

An object of the invention is to provide a data transmission/reception system which is simplified in construction and in which a relatively large number of control units, microcomputer-controlled transmitting and receiving stations can also be connected with more reasonable construction and cabling costs.

SUMMARY OF THE INVENTION

In its broadest aspect, the invention has two stations with transmitters and receivers interconnected by a bi-directional data bus. The bi-direction data bus is a single wire or conductor data bus for simultaneous transmission and reception by both the stations and forms the summation point for the addition of the transmitted signals from the two transmitters. Each station is provided with a subtraction circuit, the output of which is connected to the receiver of the respective station and to which the transmitted signals from its own transmitter are supplied in each case at an input, while the bi-directional data bus is connected to the other input. In this manner, transmission of data can be achieved simultaneously.

The data transmission system according to the invention embodies the principle of the duplex connection between two transmitting and receiving stations via a common transmitting and receiving wire and a common reference potential. It allows transmission of data at high speed.

The arrangement is preferably such that the transmitting and receiving stations have summation resistors connected to the data bus while their transmitters are each connected via a level adapter circuit to the input of the associated substraction circuit. An impedance transformer is preferably used in the connection between the bi-directional data bus and the transmitters. The two impedance transformers cause the transmitted digital pulse signals to have very low impedance so that the loads produced by the level adapter circuits and by the summation resistors do not affect the voltage level at the output of the impedance transformer.

With the design of the data transmission system according to the invention, it is possible to connect two inter-communicating transmitting and receiving stations via a single wire data bus for simultaneous transmission and reception, without interference occurring in the transmission of data. The use of only a single wire as data bus in the bi-directional communication considerably reduces the expenditure required for cabling. This applies, in particular, in systems in which, as in electro-hydraulic control systems, a plurality of transmitting and receiving stations in the form of the integrated individual control units need to be coupled for the bi-directional data traffic for adjacent communications.

As mentioned, the system according to the invention based on the principle of the duplex circuit is particularly suitable for bi-directional data traffic between adjacent control units of an electro-hydraulic control system. In the electro-hydraulic control system, therefore, the microcomputer-controlled control units form the transmitting and receiving stations and are connected via the bi-directional data bus, by means of which associated valve units equipped with electromagnetic valves can be controlled. The control units on the adjacent roof supports are preferably combined to form groups in each case, each group being provided with its own intrinsically safe source of direct current. This results in reduced construction costs also due to the power supply because it is not necessary to provide a separate power supply for each individual control unit. In order to extend the data transmission system according to the invention beyond mere adjacent control in such a design of the electro-hydraulic support control system, it is proposed in a further development of the invention that a partial bus, which encompasses the entire group and to which the control units of the respective groups are connected, be provided in addition to the bi-directional data buses connecting the respectively adjacent control units. Data traffic in the transmission system which encompasses merely adjacent communication can be achieved by means of the partial buses allocated to the individual groups. At the same time, there is created in this way a reliable redundant data transmission system which can operate at high data density and high transmission rates, but which necessitates relatively little circuitry.

In particular, the above-mentioned system is preferably arranged such that the partial bus is connected via a resistor to an electric reference voltage, the control units inside the group each being provided with an electronic switch with which the partial bus is brought to a common reference potential (preferably earth or 0-potential) of the control units when a control unit begins transmission. The control units are each provided with a comparator which measures the potential on the partial bus and is connected on the input side to the partial bus and on the output side, on the one hand, directly and, on the other hand, via a time delay element, to the microcomputer of the associated control unit. The system is consequently arranged such that, if the partial bus is not at rest potential, i.e. does not carry the electric reference voltage, as is the case during transmission, all control units, with the exception of the unit actually transmitting, are blocked from transmission and are kept at receiving. Serial data transmission between the individual control units is therefore also possible without conflict via a single wire, namely the partial bus.

While the above-mentioned partial buses extend only over the electrically separated groups of control units, the bi-directional data buses serving for adjacent communication can connect the control units by reaching over the groups so that all groups are joined together via the data transmission system. The bi-directional data buses are preferably connected at the transition between the groups via optical couplers or the like so that these data sections are also electrically isolated from one another in a d.c. sense. A particularly simple design is achieved if the bi-directional data bus together with the power supply lines serving to supply power form the wires of a multi-core cable which can preferably be connected by means of plug and socket connectors.

The invention may be understood more readily, and various other aspects and features of the invention may become apparent, from consideration of the following description.

BRIEF DESCRIPTION OF DRAWINGS

An embodiment of the invention will now be described by way of example only, and with reference to the accompanying drawings, wherein.

DESCRIPTION OF PREFERRED EMBODIMENT

Figure 1:
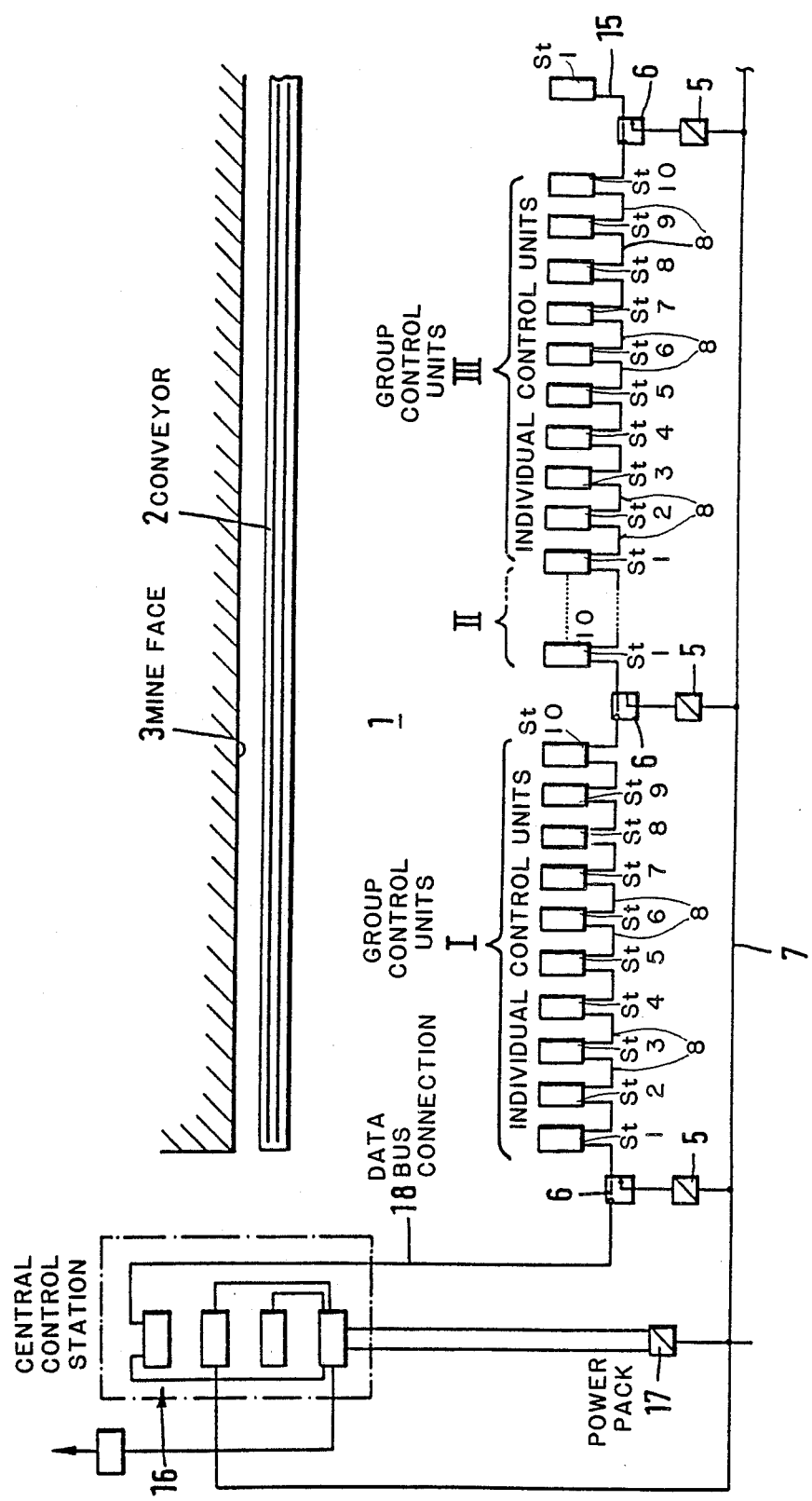
FIG. 1 is a schematic representation of part of a mineral mining installation and an electro-hydraulic control system, constructed in accordance with the invention.
Figure 2:
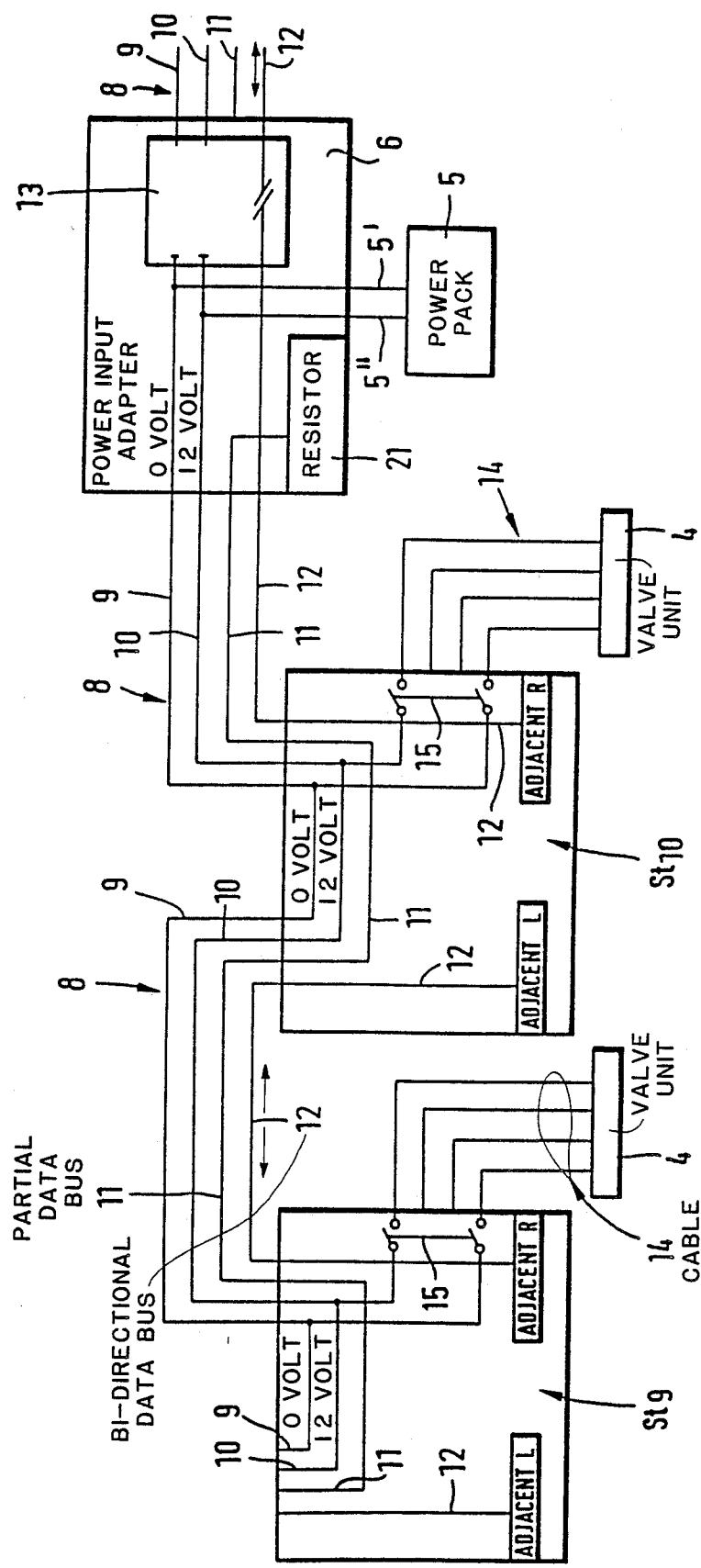
FIG. 2 is a schematic representation of part of the control system pertaining to two adjacent control units showing a preferred design for the power supply and data transmission system.

FIG. 1 represents an end region of a longwall mine working 1. The working has a mineral, e.g. coal, face 3 and the installation has a scraper-chain conveyor 2 which is positioned in front of the face 3. The conveyor 2 is composed of individual channel sections or pans arranged end-to-end and the conveyor 2 is displaced from time to time towards the face 3 with the aid of shifting rams to follow the winning progress The conveyor 2 transports mineral detached from the face 3 with a winning machine (not shown) such as a plough or shearer. On the side of the conveyor 2 remote from the face 3 there is a series of roof supports forming a step-by-step lining for the working. The conveyor 2 forms an advance abutment via the shifting rams for the supports. The roof supports can take the form of shield supports, trestles and the like in known manner. The supports have various hydraulically operated devices and electronic control units St provided on the supports have microprocessors for carrying out the various control functions pertaining to the hydraulic devices. Each control device unit St has an operator interface (not shown) with a keyboard, which, when actuated, can trigger the control functions at each control unit, and consequently at each support. The electro-hydraulic control system is constructed for bi-directional adjacent control. As shown in FIG. 2, each control unit St is connected via a cable 14 with an associated valve unit 4. The unit 4 has electromagnetic valves which are controlled by the associated control unit St in order to carry out the operating functions.

In the electro-hydraulic control system according to FIGS. 1 and 2, the control units St are combined to form individual groups I, II, III etc. with respect to their power supply, each group being supplied with power from its own intrinsically safe direct current power source or power pack 5. The groups I, II, III etc. each comprise from six to fifteen, preferably from eight to twelve control units St which are arranged next to one another in a row corresponding to their supports. Ten respective individual control units St1 to St10 are shown in the embodiment as illustrated. The power sources 5 belonging to a group are connected to the respective groups I, II, III etc. via power input adapters 6. The power sources 5 are composed of power packs connected to a common power supply line 7 which carries, for example, a 220 V alternating current and is laid through the working face 1.

Inside the individual groups I, II, III etc., the control units St1 to St10 are interconnected via the power supply conductors from the associated power source 5 as well as via a data transmission system. FIG. 1 shows these connections purely schematically at 8. These connections 8 preferably consist of multi-core electric cables which are connected by means of plug and socket connectors to the individual control units St and, in the end regions of the group, to the adapters 6.

FIG. 2 shows details of the electrical connections for two adjacent control units St9 and St10 at the end of a group I, II, III etc. with the associated adapter 6 and power pack 5 for the respective group of control units. The connecting cables 8 used for supplying power and for data transmission are designed as four-wire cables. Two conductors 9 and 10 serve for the supply of electric power and are connected to the two outputs 5 and 5" of the power pack 5. The two other conductors 11 and 12 each form a single data bus for data transmission between the various control units St. The conductor 11 forms a so-called partial bus which extends merely over the entire group I, II, III etc. and is connected to all the control units St1 to St10 of the associated group. The partial buses 11 terminate at the adapters 6 arranged between the adjacent groups. The conductors 9 and 10 used for supplying power to the adjacent groups are electrically isolated from one another at the adapters 6 at 13 so that each group I, II, III etc. represents a power supply system which is separate from that of the other groups.

The valve units 4 of the individual support are each connected Via a connection 14, also preferably composed of a multi-core cable, to the output of the associated control unit St. Each control unit St has a switch 15 serving to disconnect or supply power to the valve unit 4 associated therewith.

As shown in FIG. 1, the electro-hydraulic control system has a central control station 16 which is arranged, for example, in the end region of the longwall face with power supplied by its own intrinsically safe power pack 17 and is connected to the control units St in the longwall face 1 via a data connection 18 which connects to the data bus 12,11.

The data bus 12 of the cable 8 shown in FIG. 2 connects the respective adjacent control units St together directly and serves for bi-directional data connection for carrying out the various control functions. Each bi-directional data bus 12 consequently leads in each case from a transmitting/receiving station of one control unit St to the transmitting/receiving station of the adjacent control unit St. The data connection between the bi-directional data buses 12 is effected by the microprocessors of the control units St, so as to encompass the groups. The last control unit St10 of one group is connected to the first control unit St1 of the following group in each case via a data bus 12 in the adapter 6, and more specifically via a coupling means such as an optoelectronic means or an equivalent. The coupling means permits the passage of data signals but isolates the groups in a d.c. sense to preserve the independence of the power supply.

Figure 3:
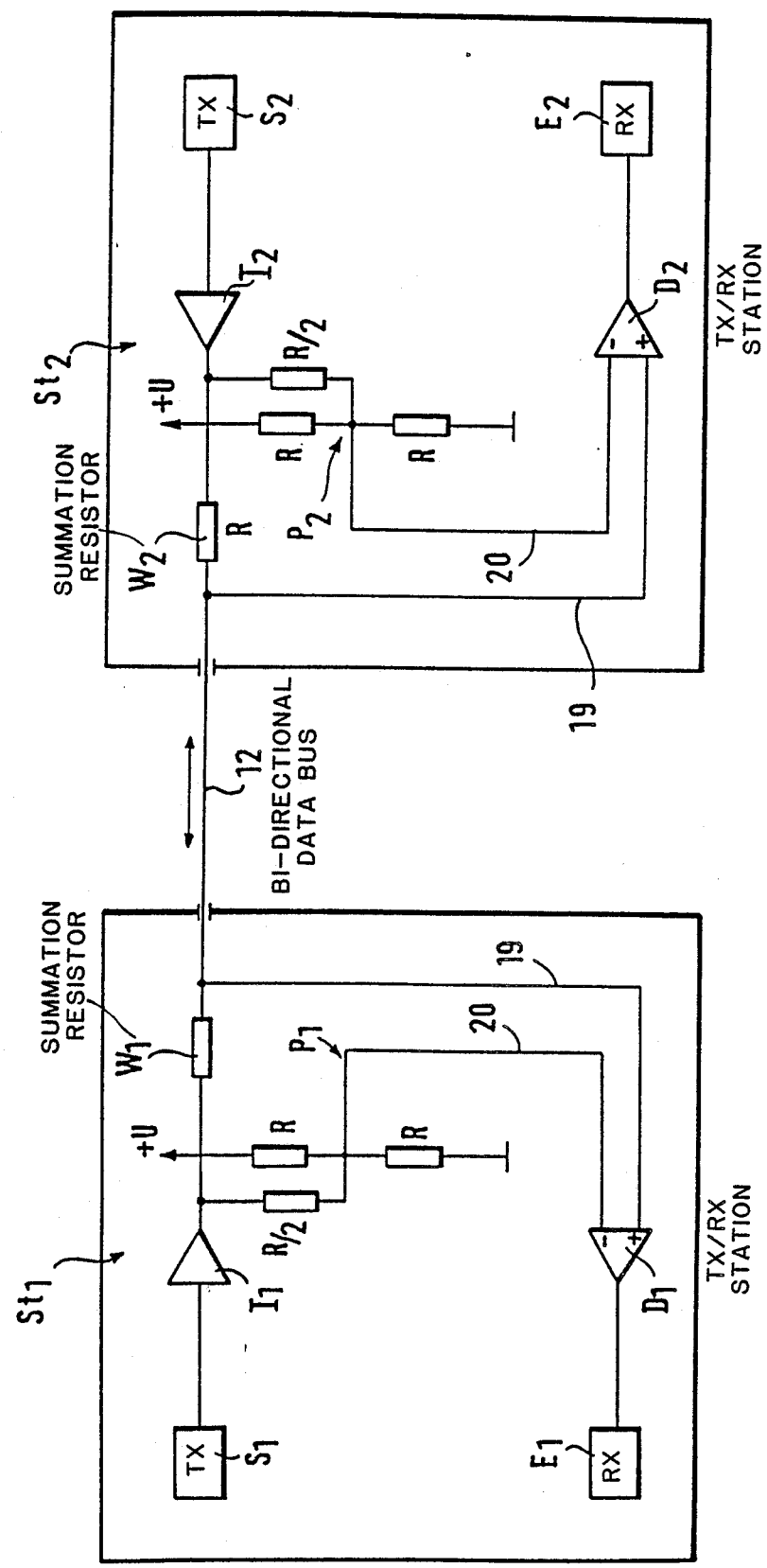
FIG. 3 is a block schematic circuit diagram of the data transmission and reception system between two adjacent stations.

FIG. 3 shows the data transmission system according to the invention between two electronic control units St1 and St2 which are represented as transmitting and receiving stations which are connected via the bi-directional data bus 12. The bi-directional data bus 12 is a single wire data bus for simultaneous transmission and reception by the two transmitting and receiving stations of the St1 and St2. The data transmission system is based on the principle of duplex connection between the two stations St1 and St2 via the common transmitting and receiving conductor 12 and a common reference potential. The transmitter devices S1 and S2 of the two units St1 and St2 transmit digital signals in the form of square wave pulses with an amplitude $+U$. The logic-0-level of the transmitted signal lies in the region of the reference potential and the logic-1-level of the transmitted signal lies in the region of the voltage $+U$. Impedance transformers I1 and I2 are provided in the connection between the transmitters S1 and S2 and the data bus 12. The impedance transforms I1 and I2 cause the output impedance of the data signals to be very low so that the loads produced by level adaptation circuits P1 and P2 and by summation resistors W1 and W2 do not affect the voltage level at the output of the impedance transformers I1 and I2.

Each station St1 and St2 also comprises a subtraction circuit D1 and D2, the output of which is connected to a receiver device E1, E2 of the respective station. The positive input of the subtraction circuit D1 or D2 is connected via a connection 19 to the summation point, i.e. to the bi-directional bus 12. The other input of the subtraction circuit D1 or D2 is connected via a connection 20 to the associated level adaption circuit P1 or P2, which is designed as a voltage divider with the two resistors R and the resistor R/2 in the circuit configuration as shown.

When both transmitters S1 and S2 are transmitting simultaneously, the transmitted signals from the transmitters S1 and S2 are added in terms of voltage at the summation point, i.e. on the bi-directional data bus 12. The two subtraction circuits D1 and D2 in the stations St1 and St2 are supplied via the associated level adaptation circuit P1 or P2 in each case with the amplitude-adapted data of its own transmitter S1 or S2, more specifically, these data are connected to the subtraction input. On the other hand, the summation point, i.e. the bi-directional data bus 12, is connected to the positive input of the subtraction circuit. The two subtraction circuits D1 and D2 consequently form the difference from the addition of the two data levels of the summation point or the data bus 12 and the transmitted data produced in its own transmitting and receiving network. A signal flow corresponding to the transmitted signal from the other respective transmitting and receiving network is thus formed at the output of the subtraction circuits D1 and D2. The transmitted data from the transmitter S2 consequently reaches the receiver E1 and the transmitted data from the transmitter S1 the receiver E2.

In the data transmission/reception system described above, one respective half of the operating resistance is arranged symmetrically in the two stations St1 and St2. The voltage drop which is caused not by its own current source but consequently by the other current source is received at the node (data bus 12). The voltage caused by itself is subtracted in each case.

In the data transmission system according to FIG. 3, the voltage values of the voltage signals transmitted by the two transmitters are subtracted. The system can also be designed with basically the same structure in such a way that the current values of the transmitted rectangular signals are subtracted via the subtraction circuits.

Figure 4:
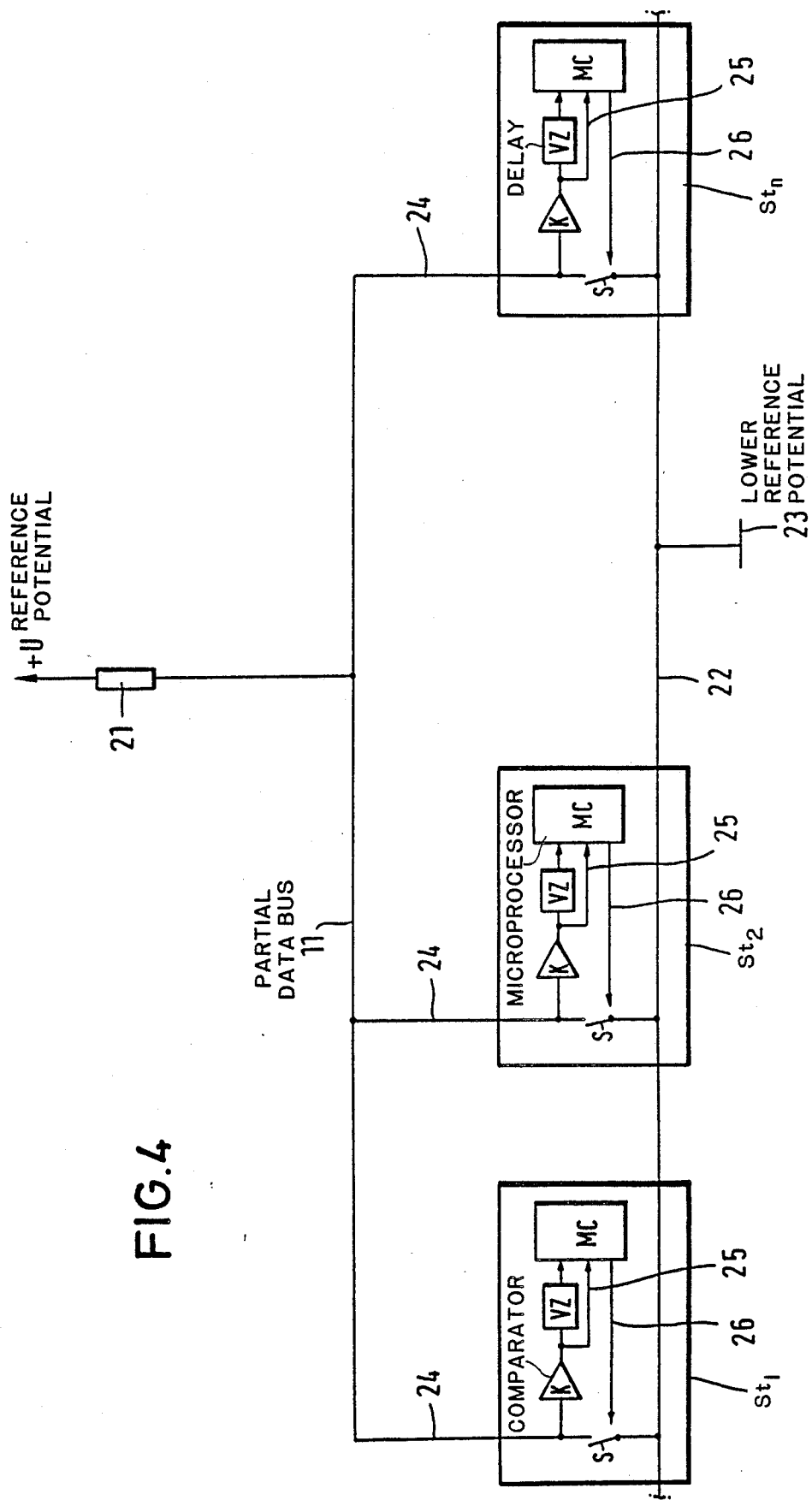
FIG. 4 is a block schematic circuit diagram of the group-related partial bus data transmission system.

FIG. 4 shows an advantageous transmission/reception system for data transmission between a group of control units St1, St2, . . . Stn. This system can be used advantageously in the electro-hydraulic control system for data transmission via the partial bus 11 of the individual groups. The control units St1, St2 etc. form microcomputer-controlled transmitting and receiving stations which are connected via a single wire data bus 11 (partial bus) in addition to the bi-directional data bus 12. The individual units St1, St2, . . . Stn have a common reference potential. The common connecting line, i.e. the data bus 11, is brought via a pull-up resistor 21 to a predetermined reference voltage $+U$. Each of the connected units St1, St2, . . ., Stn has its own switch S which can be switched electronically and by means of which the common data bus 11 can be brought to the lower reference potential 23. This is symbolised by the line connection 22 which is connected, for example, to earth. The switches S lie in a connecting line 24 which connects the data bus 11 to the reference potential. If a switch S of the units St1, St2, . . ., Stn is closed, the potential of the data bus 11 is at the lower reference potential. If, on the other hand, all switches S are opened, the potential of the data bus 11 is equal to the reference voltage $+U$, because no current flows through the resistor 21.

Each unit St1, St2, . . . Stn also possesses a comparator K, which is connected on the input side via the connection 24 to the data bus 11 and on the output side, on the one hand, via a connection 25 directly and via a delay element VZ indirectly to the microprocessor or microcomputer MC of the unit. The delay element VZ preferably consists of a re-triggerable monostable device. The microprocessor MC is capable of switching the electronic switch S which therefore immediately forms the transmission switch of the respective unit St. The microprocessor MC is consequently connected via its output connection 26 to the electronic switch S.

The data system according to FIG. 4 operates as follows: The comparators K in all units St1, St2, . . ., Stn measure the potential on the data bus 11. If there is no transmission activity on the data bus, its potential is equal to the reference voltage +U. If the data bus 11 is connected to the reference voltage level +U beyond a time interval determined by the delay of the delay elements VZ, then it is detected at each unit as being cleared for transmission. One of the microprocessors MC of the various units, namely the microprocessor which the data bus 11 has first detected as free or has been the first to commence transmission, now actuates the switch S in its transmission function so that the voltage of the data bus 11 drops to the reference potential 23. All other transmitting and receiving stations are then blocked from the transmission function by suitable design of the software. The microprocessor MC in the unit which the data bus 11 has claimed for itself transmits its transmission data through periodic switching of the electronic switch S to the data bus 11 while all other units are switched- to receiving. The transmitted data passes via the undelayed output line 25 of the comparator K to the receivers of the units available for receiving.

For the mode of operation of the transmission system described above, it is necessary for the maximum duration of the positive signal level (switch S opened) in the transmission function to be shorter than the delay time of the delay elements VZ. A transmitting and receiving station will therefore invariably act upon the data bus 11 only after the data bus 11 has been at the reference voltage level +U at least for the duration of the delay time of the delay elements VZ. As information can be exchanged via the common data bus 11, the access priorities of the individual transmitting and receiving stations can also be readily controlled. Asynchronous bus access as well as synchronised bus access is consequently possible.

The data transmission system shown in FIG. 3 can be used particularly advantageously in the electro-hydraulic control system of FIG. 1, preferably in combination with the partial bus data transmission system according to FIG. 4. However, the data transmission system according to FIG. 3 can also be used in other similar or comparable situations. Such applications are often encountered in mining and civil engineering, for example in the monitoring and/or control of mining extraction plant, of partial cutting or complete cutting machinery, of advancing or cutting shields etc.

I claim:

1. An electro-hydraulic control system comprising control units associated with roof supports, said control units serving to actuate electro-magnetic valves and being arranged in groups with each group of control units allocated to several adjacent supports having an intrinsically safe D.C. electrical energy source associated therewith, microcomputer-controlled data transmission and reception stations which are associated with the control units, a bi-directional data bus interconnecting adjacent pairs of the transmission and reception stations and a partial-bus which overlaps the transmission and reception stations of the groups of the control units and forms a further data channel with which the transmission and reception stations of the control units of the relevant group are coupled for data communication; wherein the bi-directional data bus is a single-wire data bus for simultaneous transmission and reception of data between the transmission and reception stations of an adjacent pair of said control units and forms a summation point for the addition of the transmission signals of the stations, each of the transmission and reception stations is provided with a subtraction circuit with an output connected to the receiver of the relevant transmission and reception station, a first input to which the transmission signals of the transmitter of the relevant transmission and reception station are conveyed and a second input connected to the bi-directional data bus.

2. A control system according to claim 1, wherein the transmission and reception stations are provided with summation resistors to establish connection with the bi-directional data bus and the transmitters of the stations are connected via level-adaptation circuits to the inputs of the subtraction circuits.

3. A control system according to claim 1, wherein an impedance converter is associated with the transmitters of the transmission and reception stations.

4. A control system according to claim 1, wherein the partial-bus is connected via a resistor to an electrical reference voltage and each of the control units is provided with a switch with which the partial-bus can be connected to a common reference potential at the commencement of the transmission of data from one of the control units.

5. A control system according to claim 4, wherein the control units each have a comparator which measures the potential on the partial-bus, the comparator being connected on the input side to the partial-bus and on the output side directly and also via a time delay element with the microcomputer of the associated control unit.

6. A control system according to claim 4, wherein said switch is an electronic switch which supplies the transmission data to the partial-bus.

7. A control system according to claim 1, wherein the bi-directional data-bus interconnects the control units in a group-overlapping manner while the partial-bus only extends over the relevant groups which are galvanically separated from one another.

8. A control system according to claim 7, wherein the bi-directional data bus is coupled via isolating means at the transitions between the groups of control units.

9. A control system according to claim 1, wherein the bi-directional data bus, the partial-bus and power supply conductors are united as the cores of a multi-core cable.

* * * * *